106. COMPOSITIONS, COATING OR PLASTIC.

Cross Reference

Examiner

Patented June 16, 1936

2,044,466

UNITED STATES PATENT OFFICE 2,044,466

ADHESIVE AND METHOD OF BONDING

Theodore K. Cleveland, Drexel Hill, and William Stericker, Swarthmore, Pa., assignors to Philadelphia Quartz Company, Philadelphia, Pa., a corporation of Pennsylvania No Drawing. Application April 25, 1931, Serial No. 532,982

32 Claims. (Cl. 154—33)

It is well known that adhesives made from albumin possess in high degree the desirable properties of great strength and resistance to the elements. Although albumin by itself possesses the property of agglutinant action when dissolved or dispersed in water, its general characteristics are not such as lend themselves to ready application. One disadvantage is the short working life of the prepared adhesive; another is that albumin by itself requires heating to develop water-resistant characteristics. Among other objections are its high cost when used alone. Various other materials have therefore been added in the prior art to reduce the cost and to develop more satisfactory properties. Basic among these in many formulas are silicate of soda in the customary commercial liquid forms and/or hydrated lime, which additions have reduced the cost appreciably and lengthened the working life and quality, at the same time rendering the finished bond highly resistant to moisture. Various other additions have been made in many instances, such, for example, as ammonia, to impart specific properties.

The foregoing statement applies particularly to adhesives made up from albumin derived from blood or from blood itself. They are characterized (despite the various additions made thereto) by the necessity of heating the adhesive after application to effect the desired insolubility as well as by a working life which is still so short that new batches of adhesive have to be made up each time used, a procedure which is uneconomical of time since several hours are required for preparation according to recommended procedures.

In another class of adhesives familiar to the art, proteins of vegetable origin are basic in the formulas, notably those employing soya bean flour, peanut meal, cottonseed meal, linseed flour, etc. These have been employed frequently in connection with a caustic alkali and alkaline earth hydroxide, although other alkalis which have the ability to bring these proteins into solution, such as trisodium phosphate, sodium carbonate or even borax, have been employed.

In still another class of formulas in which albuminous substances, particularly blood or products derived therefrom, are basic, insolubilizing agents such as formaldehyde, para formaldehyde, or hexamethylene tetramine, have been employed, while rubber in aqueous dispersion, resins, chicle, etc. have frequently been incorporated. Some of these adhesives possess the advantage of setting in the cold to a water resistant bond but formaldehyde, etc. are dangerous materials in the hands of the unskilled. These glues also must be made up on the job. They involve the use of liquid reagents in certain instances, the formulas given are more or less complicated, and in short they do not possess the advantages cited below as inherent in our present invention.

The present invention has for its primary object the provision of an adhesive which overcomes the principal disadvantages of former products such as those enumerated above.

More specifically stated, among the objects of our invention are the following:

1. The provision of dry preparations of blood albumin glues which are made ready for use when properly moistened.
2. The provision of dry adhesive mixtures which may be kept for long periods of time and used simply by moistening the mixture and applying it immediately or by applying the dry powder to the moistened surfaces to be joined.
3. The provision of adhesives of the character described which possess the property of forming a strong, water-resistant bond without the necessity of applying heat.
4. The provision of a dry albuminous glue mixture which may be made up and sold as a new and useful commercial product.
5. The provision of a dry albuminous glue mixture which is available for use with much less preparatory effort and time than prior albuminous glues.
6. The provision of a new albuminous glue mixture which may be stored for long periods prior to use without deterioration.
7. The provision of a dry albuminous glue mixture which may be applied directly to the surfaces to be joined in certain classes of work.
8. The provision of an albuminous glue which sets more rapidly than prior art glues of said type to produce a strong bond.
9. The provision of an adhesive which can be wet with a minimum amount of water.
10. The provision of a highly water-resistant or "waterproof" adhesive which is cheap.
11. The provision of a new method of bonding.
12. The provision of glued or laminated articles, such as plywood, of greatly improved characteristics as will appear more fully hereinafter.

Our invention includes the preparation of dry mixtures of dried blood or dry blood albumin with soluble alkaline materials of such a degree of alkalinity as will cause the albumin or blood to coagulate and thereby form an adhesive bond between two surfaces when the said mixture is moistened with the proper quantity of water and the albuminous material and alkaline material thus caused to react. Other protein materials, such as egg albumin, useful where color is an important consideration, or other similar proteins capable of reaction under the conditions herein described may be chosen without going outside the scope of our invention.

The invention has been developed around the use of readily soluble powdered alkali silicates such as $Na_2SiO_3.5H_2O$, but it is not limited to the use of the pentahydrate, or to sodium metasilicate or even to the use of alkali silicates since other alkalis or mixtures of them may serve the same purpose, such as sodium hydroxide or trisodium phosphate as examples. It is an important feature, however, that the alkali used shall be rapidly soluble and it should preferably possess high solubility.

The following is an example of a mixture according to our invention as set forth above:

| | Lbs. |
|---|---|
| Powdered commercial blood albumin | 5 |
| Powdered commercial hydrated sodium silicate of analysis approximating: | |
| $Na_2O$ — 27.5% | |
| $SiO_2$ — 55. | 5 |
| $H_2O$ — 17.5 | |

Prior to mixing, both materials are preferably reduced to a size which will pass the U. S. Bureau of Standards 65 mesh screen which has openings of .0082 in. Mixing should be most thorough, and done preferably in a dry atmosphere. This mixture is adapted for use immediately upon stirring into a paste of suitable consistency with water or it may be dusted in dry form on wet surfaces to be joined. We prefer the latter method because of the rapidity of setting which makes it difficult to handle the glue in paste form.

The following is a second example of a mixture according to our invention:

| | Lbs. |
|---|---|
| Powdered commercial blood albumin | 5 |
| Powdered sodium metasilicate pentahydrate | 5 |

As with the first example, both materials preferably should be capable of passing a 65 mesh U. S. Bureau of Standards screen prior to effecting the mixture, and the mixing is to be done preferably in a dry atmosphere and most intimately. This mixture is adapted for use by dusting it on wet surfaces or by applying it to a dry surface and then wetting.

In general, the higher the degree of alkalinity of the alkaline constituent used in the mixture, the quicker will setting be effected to a strong insoluble bond in practice. Thus the mixture of Example 2 will set more quickly than that of Example 1 and the bond will be stronger and more resistant to water and exposure.

Caustic soda being the most alkaline of sodium compounds, it might be regarded as the most desirable sodium alkali to use. However, powdered mixtures of caustic soda and albumin are regarded as of doubtful practical commercial value owing to the deliquescent nature of this alkali and its powerful tendency to absorb carbon dioxide, although the foregoing is not to be interpreted in any manner as a disclaimer of said powdered mixture.

On the other hand, in the use of alkalis of alkalinity less than that of Example 1 (sodium disilicate) the setting period becomes greater, and eventually the addition of silicate of soda of higher and higher $SiO_2:Na_2O$ percentage ratios to blood albumin causes a slowing up rather than an acceleration of setting, as noted in connection with the discussion hereinbefore on the customary use of liquid silicates.

At this point, it should be noted that in the practice of our invention setting or bonding is effected as a result of chemical reaction or coagulation in contradistinction to coagulation by the use of heat as in the prior art. Therefore, we do not contemplate the use of any alkali of alkalinity so low as to require heating as heretofore understood, viz., the use of temperatures in the neighborhood of the boiling point of water or even substantially above.

However, in order to develop in full degree the water-resistant characteristics of the less alkaline glue mixtures, temperatures somewhat above average atmospheric temperatures may be employed, but such heating should be of an order which is insufficient in and of itself to effect the necessary coagulation of the albumin, our invention contemplating the use of an alkali of such character as to chemically coagulate the albumin.

The foregoing examples are illustrative merely and we do not desire to be limited to the specific materials or the compositions cited, since a considerable variety of purposes and applications may be served by varying the compositions of powder and/or the amount of water employed. Inert solid material may also be added.

We desire to claim broadly any powdered mixture of albumin or powdered blood with powdered alkali which will yield a stable powdered mixture and a useful adhesive product capable of effecting a firm, water-resistant bond upon proper moistening with water.

It is to be understood further that the addition of inert materials to the powdered mixture of albuminous material and alkali or to either one separately prior to mixing, for the purpose of cheapening or modifying the body of the glue, is contemplated within the scope of the invention.

According to the preferred technique in applying adhesive mixtures, having an alkalinity of the order of the mixtures cited as Examples 1 and 2, the dry powder is applied to one or both of the wet or wetted surfaces to be joined. These surfaces may be prepared in any suitable way. It is highly desirable that the surfaces to be joined should be uniformly damp over their whole area, in order to effect a uniform action on the adhesive. Excessive moisture tends to delay setting time and further to draw the glue into the body of the object away from the glue line, which may weaken the bond or require more adhesive, or both, especially if one or both objects are of porous nature. Excess moisture is removed preferably just prior to application of the adhesive. The adhesive mixture may be applied by uniformly dusting it over one or both of the moist surfaces, joining said surfaces immediately and under pressure, and maintaining the pressure until firm and complete bonding is effected in the cold. In general, 45 minutes under pressure is ample to effect the formation of a strong and permanent bond, very highly resistant to the action of the elements.

It has been noted that strongly alkaline mixtures according to the present invention cause immediate coagulation and setting, and that relatively weakly alkaline mixtures as applied in liquid form in the prior art set slower, in fact, that the addition of weakly alkaline materials to albumin solutions retards the setting rate. Accordingly, then, there is an intermediate range of alkalinity within which dry powders according to the present invention can be prepared and put into use by mixing with a suitable proportion of water and immediately applying either to a dry or wet surface prior to the actual coagulation, which is effected shortly thereafter, with the production of a strong durable bond although one less water-resistant than that of the more alkaline type of adhesive powder.

In conclusion, we should like to point out that our invention contemplates the production of an improved plywood as a new article of manufacture as well as to a novel method of making it, in accordance with the following description.

Sheets of veneer are cut from a water-soaked log in the manner well-known to the art. These sheets may then be passed through rolls in order to remove excess water after which a quantity of our dry adhesive mixture is applied to the surface of a sheet on which the bond is to be made. Another sheet may then be placed in position against the first strip, either with or without a similar coating of dry adhesive and the two sheets placed in a press. Pressure is maintained for a relatively short time, for example from 15 to 60 minutes, after which the article is removed and allowed to dry in the air, application of artificial heat being unnecessary.

This procedure entirely eliminates the initial drying of the sheets after they are cut, which has heretofore been customary in the art, and substitutes the sifting of a powder onto the wet sheets for the usual application of a liquid adhesive. In addition, the length of the pressing operation is materially shortened and the customary final drying at rather elevated temperatures is made entirely unnecessary. This method, therefore, is less costly, avoids wastage of adhesive due to spoilage of batches which may not be used promptly, and does not cause offensive odors or attract vermin as do wet mixtures. Furthermore, irregularities of mixing by relatively unskilled persons or under uncontrolled conditions are avoided with their incidental variations in adhesive effect. Uneven results due to variations in the temperature of the ordinary steam-heated platens used in pressing plywood of this kind are also obviated and the resulting bond is strong and highly resistant to boiling water or prolonged soaking.

It is to be understood, of course, that the method of bonding just described in connection with plywood might be applied equally well to the manufacture of other glued or laminated articles.

What we claim is:—

1. A stable, dry, adhesive mixture containing a protein which is chemically coagulable by an alkali and a water soluble alkali metal silicate in which the alkali metal : $SiO_2$ ratio is not less than 1:2.

2. The article of claim 1 wherein the alkali metal silicate is a sodium silicate.

3. The article of claim 1 wherein the alkali is a sodium metasilicate.

4. The article of claim 1 wherein the alkali is a hydrated sodium metasilicate.

5. A stable, dry, adhesive mixture containing albumin and a water soluble alkali metal silicate wherein the alkali metal : $SiO_2$ ratio is not less than 1:2.

6. The article of claim 5 wherein the soluble alkali metal silicate is a sodium silicate.

7. The article of claim 5 wherein the soluble alkali metal silicate is a hydrated sodium metasilicate.

8. The article of claim 5 wherein the soluble alkali metal silicate is sodium metasilicate pentahydrate.

9. A stable, dry, adhesive mixture containing dried blood and a water soluble alkali metal silicate wherein the alkali metal : $SiO_2$ ratio is not less than 1:2.

10. The article of claim 9 wherein the alkali metal silicate is a sodium silicate.

11. The article of claim 9 wherein the alkali is a sodium metasilicate.

12. The article of claim 9 wherein the alkali is a hydrated sodium metasilicate.

13. As a new composition of matter, an adhesive in dry form composed of substantially equal parts by weight of powdered blood and sodium silicate, the $Na_2O:SiO_2$ ratio in the silicate being not less than 1:2.

14. As a new composition of matter, an adhesive in dry form composed of substantially equal parts by weight, of powdered blood and sodium metasilicate.

15. A method of making plywood which comprises applying between adjacent faces of wet veneer a dry adhesive mixture including blood albumin and a soluble silicate of alkalinity sufficient to chemically coagulate the albumin in the presence of the moisture of the veneer, pressing and drying.

16. As a new article of manufacture, the product of claim 15.

17. The method of uniting layers of plywood which includes forming an adhesive film in situ by chemical reaction between a soluble silicate and protein upon addition of moisture at a temperature below that which would be necessary to coagulate the protein by means of heat.

18. The method of uniting layers of plywood which consists in forming an adhesive film in situ by chemical reaction between a soluble alkaline salt and protein in the presence of added moisture at a temperature below that which would be necessary to coagulate the protein by means of heat.

19. The product of claim 18.

20. A method of adhesively uniting surfaces which includes spreading therebetween a powdered mixture of alkali and protein capable of reacting upon addition of moisture to chemically coagulate the protein and then causing the coagulation to take place in situ at a temperature below that which would be necessary to coagulate the protein by means of heat.

21. A product made in accordance with claim 20.

22. A method of bonding which comprises applying between the wetted articles to be united a dry adhesive mixture including blood albumin and a soluble silicate of alkalinity sufficient to chemically coagulate the albumin in the presence of the moisture carried by the articles, pressing and drying.

23. As a new article of manufacture the product of claim 22.

24. A method of bonding which includes applying to the articles to be bonded a dry, adhesive mixture containing protein and sodium metasilicate, adding moisture, pressing and drying.

25. A method of bonding which includes applying to the articles to be bonded a dry, adhesive mixture containing protein and water soluble alkali metal silicate of alkalinity sufficient to effect chemical coagulation of the albumin upon the addition of moisture, supplying moisture, pressing, and drying.

26. The article of claim 25.

27. The method of claim 25 wherein the soluble alkali metal silicate is hydrated sodium metasilicate.

28. The method of claim 25 wherein the soluble alkali metal silicate is sodium metasilicate pentahydrate.

29. A method of bonding which includes applying to the articles to be bonded a dry, adhesive mixture containing albuminous materials capable of chemically setting to form the bond upon the addition of moisture without the application of heat, supplying the moisture, pressing and drying.

30. The article of claim 25 where the alkali metal silicate is sodium silicate.

31. The article of claim 5 wherein the alkali is a sodium metasilicate.

32. As a new composition of matter, a dry adhesive composed of a mixture of blood albumin and a silicate of soda of alkalinity sufficient to chemically react with the albumin in the presence of moisture to form a substantially water-resistant adhesive film, the ratio of $Na_2O:SiO_2$ in the silicate of soda being not less than approximately 1:2.

THEODORE K. CLEVELAND.
WILLIAM STERICKER.